United States Patent [19]

Hanni

[11] 4,145,657

[45] Mar. 20, 1979

[54] RADIO TRANSMISSION SYSTEM FOR TWO SUBSCRIBERS TO HAVE A MUTUAL CONNECTION ON ONE OF SEVERAL FREQUENCY CHANNELS AND HAVING TIME MULTIPLEX INTERLACE OF PREFERRED CHANNELS

[75] Inventor: Manfred Hanni, Puchheim, Fed. Rep. of Germany

[73] Assignee: Siemens Aktiengesellschaft, Berlin & Munich, Fed. Rep. of Germany

[21] Appl. No.: 775,459

[22] Filed: Feb. 22, 1977

Related U.S. Application Data

[63] Continuation of Ser. No. 494,861, Aug. 7, 1974, abandoned.

[30] Foreign Application Priority Data

Aug. 8, 1973 [DE] Fed. Rep. of Germany ....... 2340136

[51] Int. Cl.² .............................................. H04K 1/00
[52] U.S. Cl. .................................. 325/32; 179/2 EB; 179/15 BZ; 325/5; 325/57
[58] Field of Search ............................. 325/5, 57, 32; 179/15 BY, 15 BZ, 41 A, 2 EB

[56] References Cited

U.S. PATENT DOCUMENTS

| 2,510,316 | 6/1950 | Marlowe ................................. 325/57 |
| 3,118,018 | 1/1964 | Cornell et al. ...................... 179/2 EB |
| 3,548,106 | 12/1970 | Watson et al. ............................ 325/5 |
| 3,582,787 | 6/1971 | Muller et al. ........................... 325/53 |
| 3,634,627 | 1/1972 | Velentine ............................ 179/41 A |
| 3,692,952 | 9/1972 | Leonard ............................. 179/41 A |
| 3,707,679 | 12/1972 | Bruley et al. ............................ 325/5 |
| 3,789,137 | 1/1974 | Newell ........................... 179/15.55 T |
| 3,803,363 | 4/1974 | Lee ................................. 179/15.55 T |
| 3,846,827 | 2/1973 | Eppler, Jr. ..................... 179/15.55 T |

Primary Examiner—Howard A. Birmiel
Attorney, Agent, or Firm—Hill, Gross, Simpson, Van Santen, Steadman, Chiara & Simpson

[57] ABSTRACT

A radio transmission system in which two subscribers use only one of possibly several frequency channels for a mutual connection is characterized in that in the individual frequency channel which is provided for the connection of the two subscribers the information flow of the subscriber transmitting at a particular moment in time is interrupted in, preferably, regular time intervals for a very short time in comparison with the transmission time in order to establish a return connection, in the manner of a time slot channel, having a low transmission capacity in comparison to the actual frequency channel. In this time slot channel, information of the return connection is transmitted.

8 Claims, 6 Drawing Figures

RADIO TRANSMISSION SYSTEM FOR TWO SUBSCRIBERS TO HAVE A MUTUAL CONNECTION ON ONE OF SEVERAL FREQUENCY CHANNELS AND HAVING TIME MULTIPLEX INTERLACE OF PREFERRED CHANNELS

This is a continuation, of application Ser. No. 494,861, filed Aug. 7, 1974, now abandoned.

BACKGROUND OF THE INVENTION

1. Field of the Invention

This invention relates to a radio transmission system, and more particularly to such a transmission system in which two subscribers utilize a single one of several frequency channels for a mutual connection.

2. Description of the Prior Art

With radio transmission systems of the type mentioned above, there are usually only few radio frequency channels (RF channels) compared with the number of subscribers available. Therefore, it is particularly difficult to assure a mutual communication for as many subscribers as possible, since either two subscribers use channels of different frequency each time for the forward and return direction, or, if using only one channel for forward and return direction, the individual subscriber must wait until the other subscriber releases the connection so that he may speak. In the first case, the total number of subscribers has available practically only half the number of frequency channels for establishing connections; whereas, in the second case, a considerable obstruction is presented during the handling of calls.

SUMMARY OF THE INVENTION

The primary object of the invention is to provide, in the case of a radio system of the type mentioned above, a guarantee that only one frequency channel is needed for a two-way connection, but that the respective receiving subscriber can simultaneously reverse the transmission direction during the exchange of information as he desires.

This object is achieved, according to the invention, through the provision of a radio transmission system in which two subscribers utilize only a single one of possibly several channels for a mutual connection. In the individual channel which is provided for the connection of the two subscribers the information flow of the subscriber which is transmitting at a particular moment, that is in the forward connection, is interrupted in, preferably, regular time intervals for a, preferably, very short time in comparison with the transmission time. The interruption of the information flow is carried out in order to establish a return connection in the manner of a time slot channel having a low transmission capacity in comparison to the transmission capacity of the actual channel. In this time slot channel, information of the return connection is transmitted. This technique is applicable not only to a radio system having many subscribers and frequency channels, but also to a radio connection having only two subscribers and a single frequency channel.

If the number of frequency channels is considerably smaller than the number of subscribers, e.g. only equivalent to a fifth or a tenth of the number of subscribers, it is then advantageous if the transmitting/receiving system of the individual subscriber is adjustable as desired to one of preferably all frequency channels, and if each time some frequency channels, which are preferred the channels of the total number of frequency channels, are assigned to the receiver of the individual subscriber, and the receiver monitors these frequency channels one after the other in the time slots with respect to the presence of information of other subscribers and provides that when such information is present, an identification is made at the corresponding subscriber.

The establishment of the connection between two subscribers takes place advantageously in such a way that the calling subscriber transmits a call in a free one of the preferred frequency channels of the subscriber to be called. After receipt of this call, the called subscriber causes a return call to the calling subscriber in this frequency channel creating a synchronization of both subscribers with respect to the time slot channel and, if necessary, to the subscriber's crypto devices, and that after effecting synchronization, the transmission of information between the subscribers is initiated.

If a connection exists between two subscribers, the information transmitted in the time slot channel from the called subscriber to the calling subscriber is advantageously used for the return of the transmission direction in the existing connection.

Furthermore, in the case of an existing connection between two subscribers, the information transmitted in the time slot channel from the calld subscriber to the calling subscriber is advantageously used for the adjustment of the transmitting performance to a minimum level required for the transmission in the case of the calling subscriber.

The incorporation of the return connection by way of a time slot channel makes it possible to divide the time slot channel in an advantageous manner as in a time multiplex system into several time sharing function channels which are interlaced. This means, for example, that a first time slot is used for the possible return of the transmission direction, whereas the time slot following the first channels serves for the adjustment of the transmission level of the respective subscriber station transmitting at that moment, and the next following time slot is utilized either again for the reversal of the transmission direction or for other services.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENT

Figure 1:
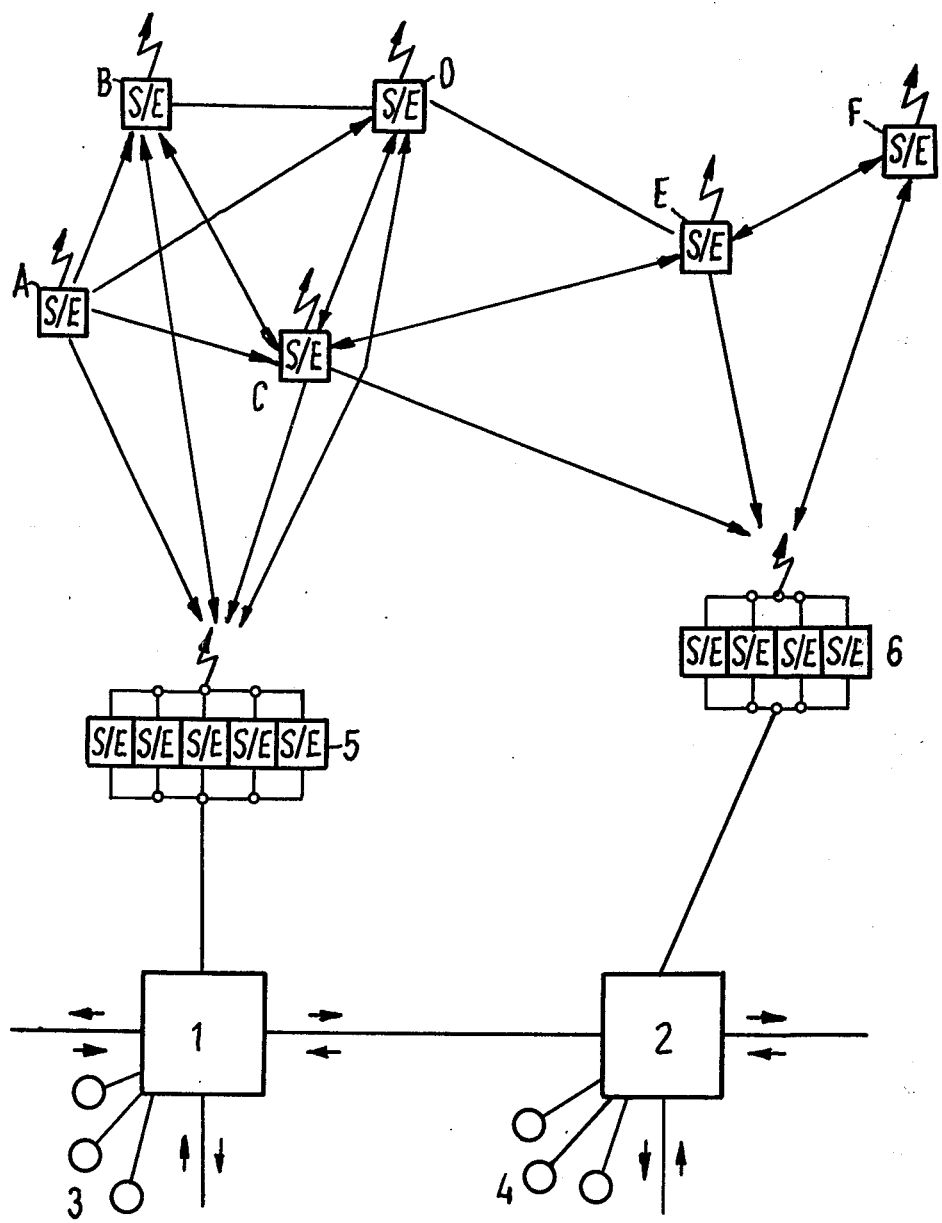
FIG. 1 is a block diagram of a transmission system for a network having mobile subscribers interconnected by way of radio concentrators.

The invention will be explained in detail by way of reference to an exemplary embodiment thereof. The invention is of particular interest for radio networks with mobile subscribers which are connected to an existing network-type constructed communications transmission system by way of radio concentrators. FIG. 1 illustrates an example of such a network. In FIG. 1, two mobile nodal exchange stations of a communication network are identified with the reference characters 1 and 2, the stations being connected with each other and among a number of such stations by common transmission systems, e.g. open wire lines, coaxial lines, and radio relay links. Also, individual subscribers may be connected to the exchange stations as indicated by the subscriber groups 3 and 4. One of these directly connected subscribers in the exemplary embodiment illustrated herein is a radio concentrator.

A radio concentrator 5 is connected to the exchange station 1, and a radio concentrator 6 is connected to the exchange station 2. The individual radio concentrator (5, 6) comprises a greater number of transmitting-/receiving devices S/E and will be explained in detail below.

The mobile stations, designated in the exemplary embodiment with A, B, C, D, E, and F, are located in the coverage range of the transmitting/receiving device of the individual radio concentrator. These mobile stations may move within the range of the individual radio concentrator, e.g. the radio concentrator 5, and may also move from the coverage range of this particular concentrator into that of another radio concentrator, e.g. that of the radio concentrator 6. Possible connections in the area of the radio concentrators 5 and 6 and the subscribers A-F are schematically indicated in FIG. 1 by the arrows, i.e. direct and indirect connections between mobile subscribers as well as connections of mobile subscribers by way of one or several of the radio concentrators, and, if necessary, even by way of the exchange stations. It is also possible, for example, that a subscriber which is connected to an exchange station, comes into contact with one of the mobile subscribers.

A radio system constructed in accordance with the invention will be explained hereinbelow in more detail with reference to FIGS. 2-6, by means of a detailed description of an exemplary frequency allocation plan, a subscriber station and a radio concentrator station.

Figure 2:
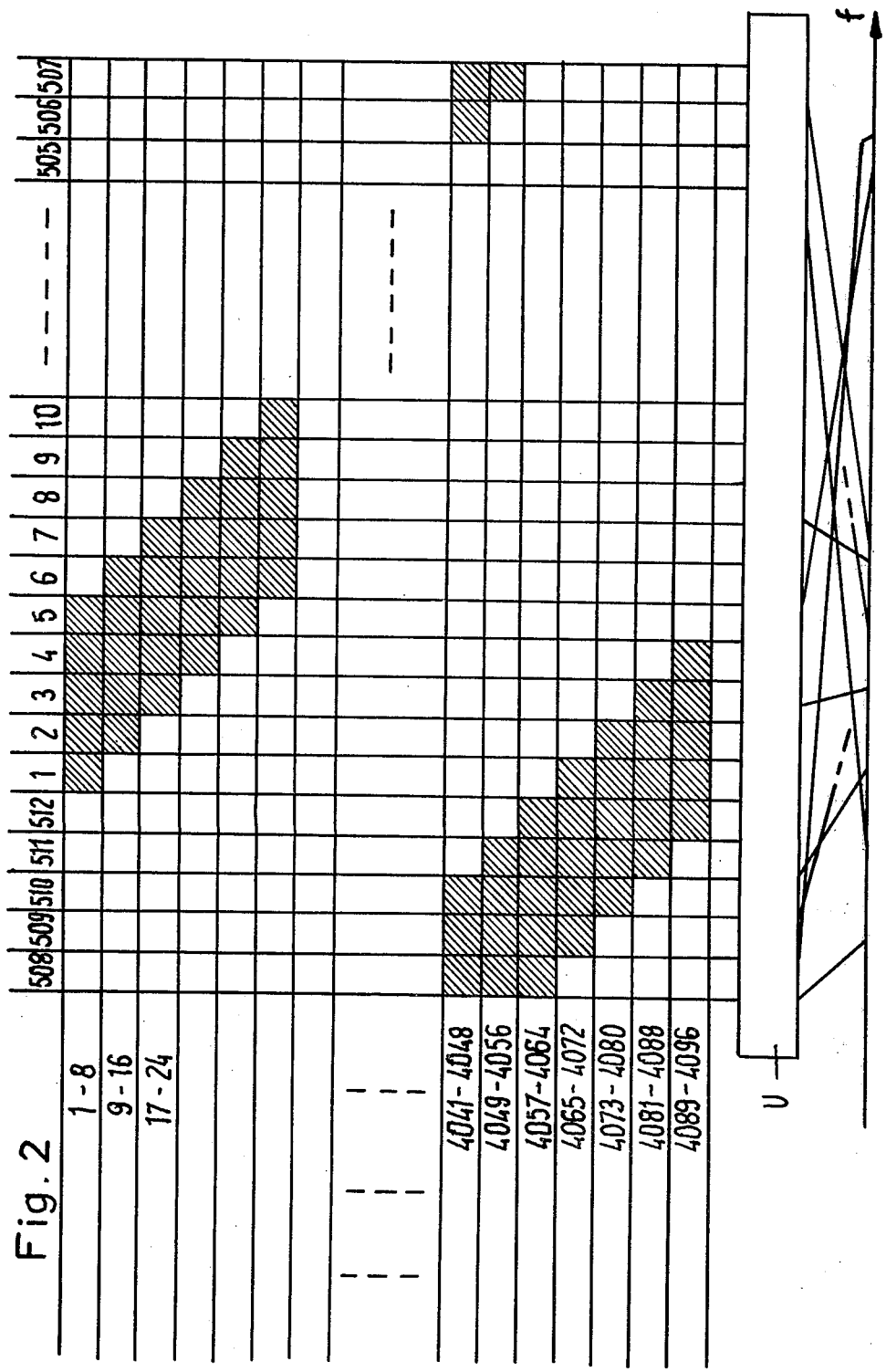
FIG. 2 is a subscriber and frequency-channel allocation chart for a system such as set forth in FIG. 1.
Figure 3:
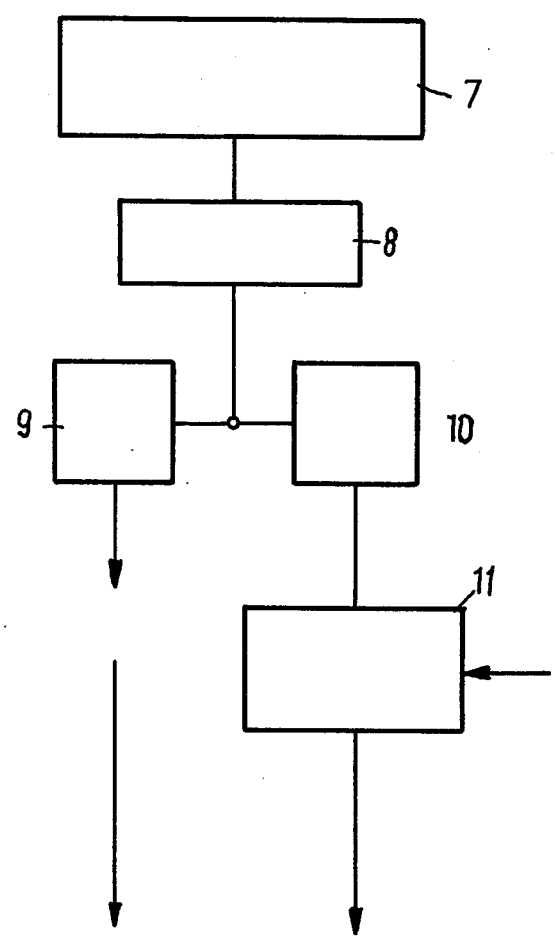
FIG. 3 is a block diagram of call number conversion apparatus.

Referring to FIG. 2, the number of subscribers may be several thousand, as is frequently provided for radio networks of this kind. As an example, assume a subscriber number of 4096. For these 4096 subscribers, e.g. 512 radio frequency channels should be available. The assignment is selected in such a way, as is illustrated in FIG. 2, that each subscriber should be able to be reached via, e.g. five frequency channels. It is readily evident that we are concerned here with radio frequency channels. These frequency channels correspond to the preferred frequency channels mentioned above. For example, each time five preferred frequency channels are assigned to each eight subscribers and, in addition, these groups of each eight subscribers are supposed to overlap with respect to the preferred frequency channels. A pattern then results, e.g. according to FIG. 2, in a manner that the frequency channels 1-5 are assigned to each of the subscribers 1-8 as preferred frequency channels, the frequency channels 2-6 are assigned to the subscribers 9-16 and the channels 3-7 are assigned to the subscribers 17-14. This assignment continues in this manner up to the final subscribers 4098-4096 to which the frequency channels 512-4 are assigned as preferred frequency channels. In this manner, a statistical distribution is achieved in the entire radio system to assure a good uniformity of the load.

For mnemonic reasons, it is frequently desired to extend the amount of call numbers far beyond the actual required degree, for example, for only 4096 requied subscriber numbers to provide a range of call numbers having seven digits. The individual seven digits subscriber number then has to trigger two processes in the system if it is elected by the subscriber. First of all, this subscriber number has to make available the call sign of the called radio subscriber for the transmission, and then, a selection of the, for example, five radio frequency channels must be effected, which channels are provided for reception at the called subscriber. This process occurs appropriately according to the system of FIG. 3 in the manner that the seven digit subscriber number is fed into a call number converter 7. For this purpose the call converter 7 includes a memory (not illustrated) for the seven digits of the subscriber number and a code converter which, after receipt of the seven digits, transmits a call sign of e.g. 28 bits in the BCD code. This call sign in the 28 bit BCD code is then translated in a translator 8, which is also capable of performing an encoding of the call numbers into a so-called concentrated radio call number of the monitored subscriber, whereby the concentrated call number primarily differs from the subscriber number fed into the translator 8 in that it comprises, e.g. only 12 bits in binary code. The translator 8 is therefore nothing more than the conventionally well known call number translator as is commonly used in telephone technique. Of the respective 12 bits of the radio call number, the first three bits distinguished each time of the eight subscribers of each group—if regarded serially—and the last 9 bits distinguish the, e.g. five frequency channels which are assigned to each of the eight subscribers of a group as receiving channels. Acordingly, the individual subscribers of the respective eight subscribers are stored in a first memory 9, and the additional 9 bits which are determinative for the receiving frequencies are stored in a second memory 10. The 9 bits which are stored in the second memory 10 are used for controlling the radio frequency producing circuit in the individual transmitting/receiving device. The five particular frequencies must be adjustable from this frequency as is desired, according to criteria which will be explained further below. A permutation circuit 11 is provided for this purpose.

First of all, when opening the call to a subscriber to be called, the frequency adjustment of the receiver of the calling station is caused via this permutation circuit to the first one of the receiving frequencies provided for the subscriber to be called. Thereby, the receiver of the calling subscriber station checks whether this radio frequency channel is free or busy. If the radio frequency channel is free, the receiver then causes the associated transmitter of the calling subscriber station to obtain the subscriber number from the first memory 9 and transmit on that particular radio frequency channel. However, if the receiver detects that the radio frequency channel is busy, it then causes a transformation of the frequency adjustment criterion in the permutation circuit 11 to the radio frequency of the next one of the five preferred receiving channels provided for the call subscriber. If this receiving channel is free, the transmission of the specific subscriber number is effected by way of this channel by the transmitter of the station. If the channel is busy, the transfer to the next one of the radio frequency channels then takes place by way of the permutation circuit 11. This process takes place until the fifth radio frequency channel is checked. If also this channel is busy, checking begins anew with the first one of the five radio frequency channels which are assigned to the called subscriber as receiving channels.

It is advisable that the stepping pulse causing transfer is faster with respect to the calling time of a station calling on one of the channels, by at least the factor as channels assigned to a group of subscribers. The stepping pulse is made faster for checking the five radio frequency channels, which are provided for a single station, as regards the presence of a call in a free station, that is a station which is not in a speaking operation. For example, in the case of five radio frequency channels, for each time one group of eight subscribers, only a fifth of the calling time of a calling subscriber should be used at the maximum, preferably in somewhat less, with each subscriber for checking each of the five receiving channels in order to be sure to receive each call.

For example, the individual frequency channel can have a band width of about 20 kHz in order to be able to transmit the information by means of pulse data modulation with a bit rate of 16 kbit/sec, and these frequency channels can arrange themselves in a frequency spacing of 25 kHz within the radio frequency range provided for the transmission system.

The step-by-step action of the frequency selection addressing of a desired subscriber may take place through the permutation circuit 11 by way of a permutation counter in accordance with various, partially already mentioned, criteria. The subscribers of each subscriber group, e.g. the subscribers 1–8, are distinguished in view of their call numbers by the bits 1–3 which are produced in the first memory 9 and which serve directly as calling codes. The bits 4–12 are therefore the frequency base address which are used jointly by the eight subscribers, the latter being distinguished in the bits 1–3. Therewith, the channel base address can be shifted in the upward direction by a maximum of four numbers by means of binary addition of the value 0–4 of the permutation counter. The permutation counter in the permutation circuit 11 is stepped up at the frequency of channel searching. If a transmitting/receiving station is only at standby, that is without an established connection, its component group 11 steps up the receiver at the rate of the channel search for such a time until a call is received in one of the five channels. When detecting a call, the receiver is then held on the respective channel.

With each building up of a call in the outgoing direction, the permutation counter in the permutation circuit 11 is also stepped up by one step. The same happens when the marked radio channel is already occupied by another station or a jamming station, or if the desired subscriber does not answer on the marked channel after a certain calling time has passed. After five steps of the permutation counter, the calling subscriber can then obtain, for example, a busy signal as a criterion for the fact that the connection to the desired subscriber is blocked, or that the subscriber cannot be reached, or, as mentioned above, the calling process may begin anew with the first of the five channels.

The assignment of the radio frequencies could be carried out, for example, in such a way that of the assumed five radio frequency channels, each time five frequency-wise successive radio frequency channels are assigned as receiving channels to a subscriber group of eight subscribers. However, this solution is usually not used in practice for reasons of avoiding a susceptibility to interference. Rather, it is advisable to distribute the five radio frequency channels which are assigned to each time one group of eight subscribers as receiving channels, across the entire radio frequency range. Provided that it is indicated in FIG. 2, by a translator U, an interlacing of the frequency channels which are assigned to the subscriber group can be enforced. The translator U can be constructed so that it becomes adjustable, by means of a punched card or a perforate tape or similar ones of such devices so that a daily or hourly exchange of radio frequency channels each of which is assigned to the individual subscriber group, is possible.

Figure 4:
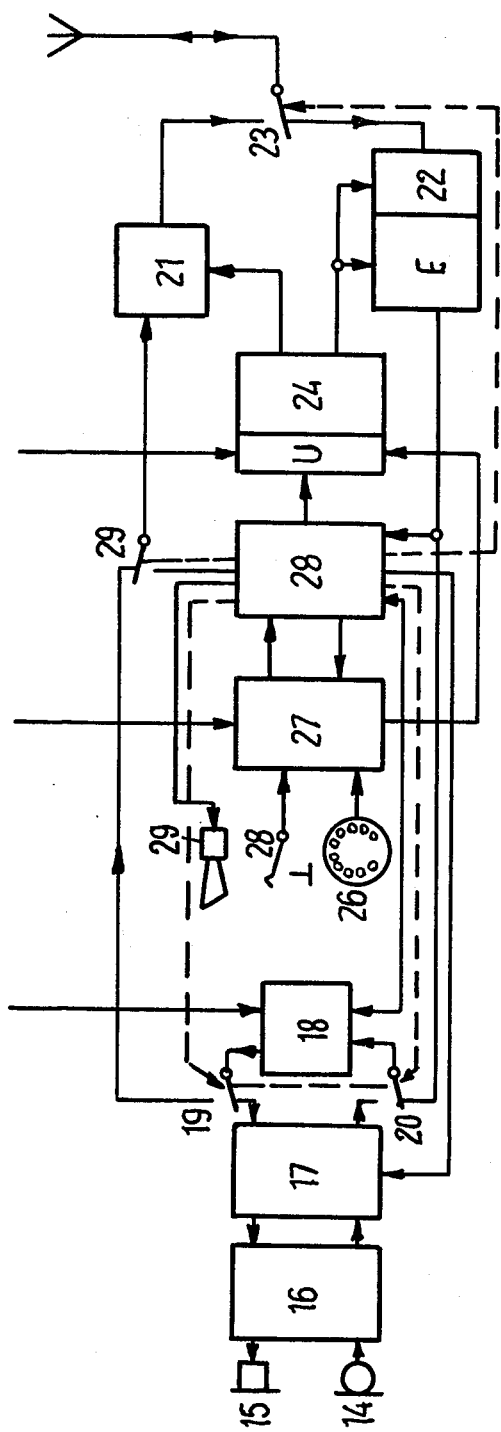
FIG. 4 is a schematic block diagram of a transmitting-/receiving apparatus constructed in accordance with the principles of the invention.

A subscriber station is illustrated in FIG. 4 which corresponds, for example, to one of the subscriber stations A–F in FIG. 1. A microphone (transmitter) 14 and a hand receiver or loud speaker 15 are connected with a pulse delta modulator and a pulse delta demodulator 16, respectively. A buffer store 17 which time wise compresses the data flow, which is coherently supplied by the delta modulator, in such a way that the mentioned time slots can be inserted, or that in the opposite direction, respectively, the information which arrives compressed from the opposite station may be expanded again into a continuous data flow.

A crypto or coding system 18 follows the buffer store 17 and is connected via electronic transfer switches 19 and 20 into the transmission direction used at that time in such a way that a coding as well as a decoding of the data flow can be carried out by the crypto device 18. The device 18 can be programmed each time with a daily keying element, for example. If a connection exists, the transmitter 21 or the receiver with preselection circuit 22, respectively, follows and are connected to an antenna, depending on the direction of transmission by way of the electronic transfer switch 23. The RF channel frequency which is used for the transmitter or the receiver, respectively, is determined via a synthesizer 24 which again is controlled by the translator U which already has been mentioned in connection with FIG. 2 and with FIG. 4. The addresses of the frequency channels which are reserved for the entire system are fed into the translator U as a RF frequency program prior to the beginning of operation. It is advisable that also the preselection circuit 22 is tuned electronically to the receiving frequency. At the beginning of the establishment of a connection, the desired call number is fed into the selection (dialing) and address computer as set forth and explained in connection with FIG. 3 and which is identified with the reference character 27 in FIG. 4, via a dial or a dialing keyboard 26. The ascertained base address is transmitted by way of the control unit 28 to the translator U or, via the switch 29 as a calling code to the transmitter 21, respectively. Also, the specific call number of the station is translated and stored in the selection and address computer 27. The control unit also detects all signaling information coming from the receiver 22 and checks the same and evaluates such information with respect to accuracy. In addition, it controls the entire time lapse in the idle condition of the station, as well as during the establishment of a connection or during an established connection, respectively.

As already mentioned above, the listening subscriber is able to reverse the direction of transmission with a press-to-talk button 28. The calling device 29' finally indicates the presence of an incoming request for connection.

Figure 5:
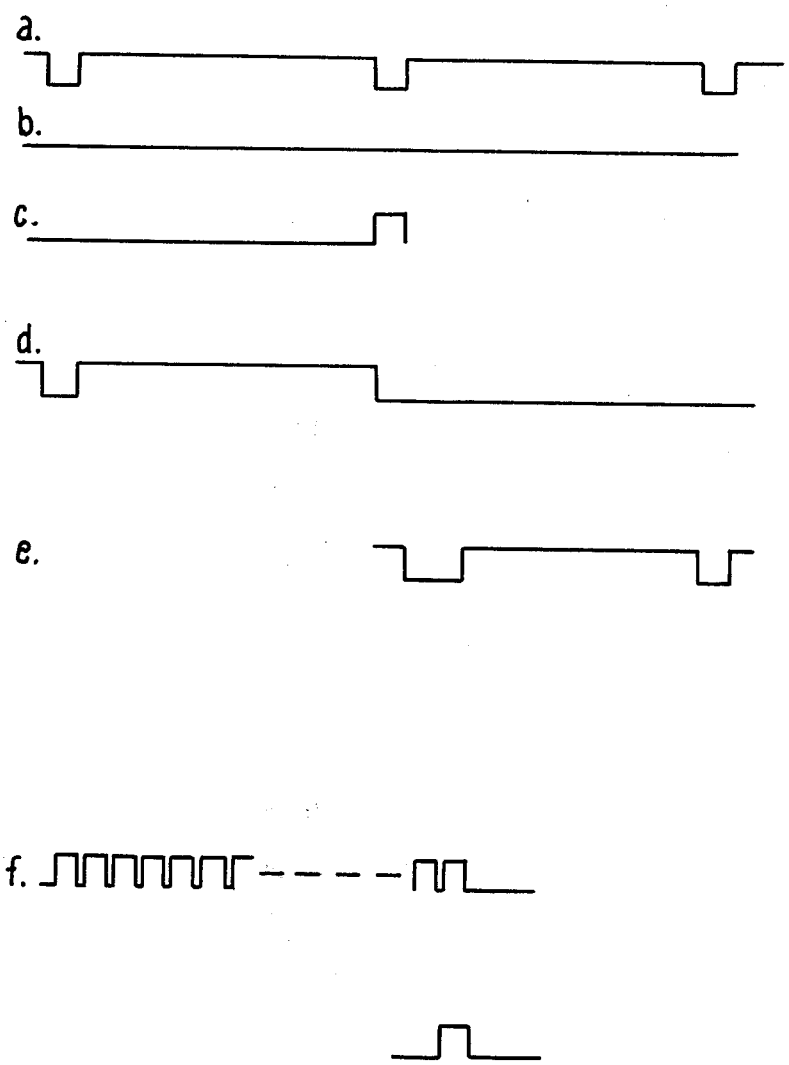
FIG. 5 is a pulse diagram to aid in understanding the invention.

In FIG. 5, the time lapse of a connection is illustrated. The lines a and b illustrate that the calling subscriber A goes on reception at regular intervals, while the listening subscriber B stands by. If now, the subscriber B pushed the press-to-talk button 28 in FIG. 4, a direction request is then transmitted by the subscriber B in the reception slot of the subscriber A (line c). If the request is understood by the device of the subscriber A, the subscriber A then stands by (line d). The subscriber B then stands by again after sending out the direction request in order to test the reaction of the subscriber A. If the subscriber A has recorded the request and if the associated transmitter is stopped as a result of this action, the subscriber B then transfers to transmitting operation and transmits a so-called synchornizing burst. The synchronizing burst contains very redundant information for timing time slot, and crypto synchronization of the subscriber A so that after the termination of this burst the new transmission direction (B to A) is generally completely synchronized and the operation continues according to the lines a and b.

In the reception time slots, both stations alternately intercept the momentary operating frequency and one of its own, e.g. five preferred frequencies. As is illustrated in line f of FIG. 5, the calling signal of a further third subscriber is illustrated as being comprised in such a way that it can be recognized in the time slot. For example, the subscriber station A leans that it is called again, and transmits a busy signal in the next time slot. This busy signal is recorded in a reception slot of the call transmission of the subscriber station C, whereafter the call transmission can be stopped and a busy signal can be given to the subscriber C.

If the subscriber C has a priority right, the call is then reported to the subscriber A. Even thought the reply message occurs in the same manner, the subscriber station C is able to keep the call as long as the subscriber C waits. However, the content of information are exchanged in such a way that there is no renewed reply message from the subscriber station A. The station A now jumps back and forth in the time slots only between the operating frequency and the frequency selected by the subscriber C in order to check the waiting condition of the subscriber C. If the subscriber station A terminates the connection to subscriber station B, the connection to the subscriber station C is then immediately put through. The entire signaling process is completely designed according to the compelled principle, i.e. each order is repeated for such a time until the corresponding reaction of the opposite station occurs.

Figure 6:
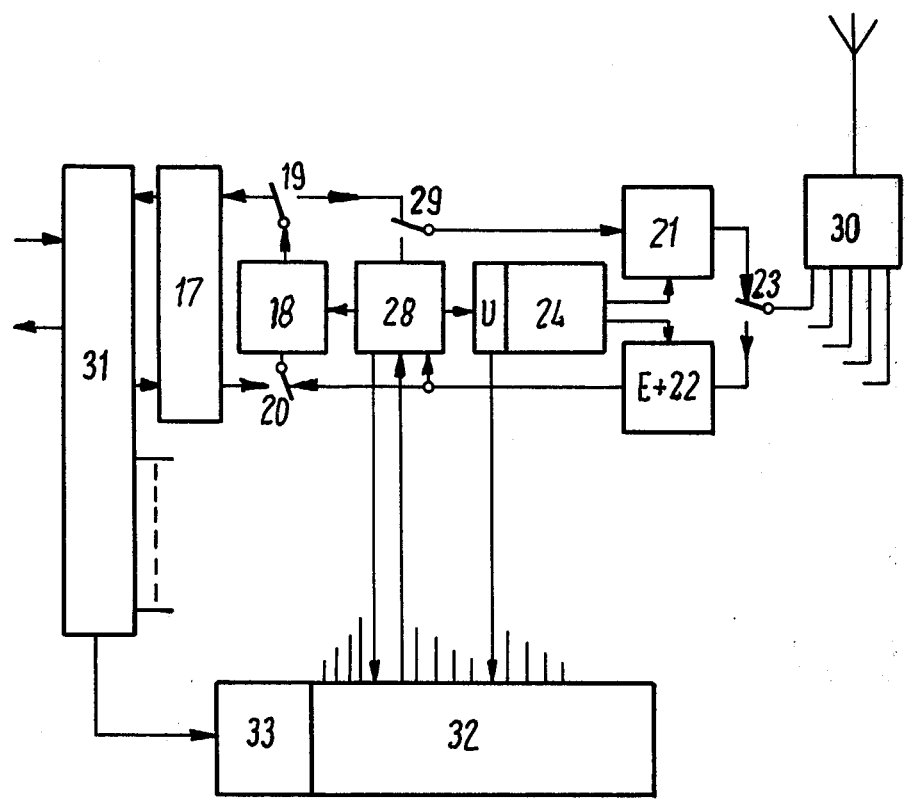
FIG. 6 is a block diagram of the invention embodied in a radio concentrator system.

FIG. 6 finally illustrates the corresponding construction in a radio concentrator for a transmitting/receiving device. As is indicated in FIG. 6, as many transmitting/receiving devices are connected in parallel via an antenna distributor 30 on one hand to a joint antenna, and via a multiplexer 31 on the other hand to the corresponding exchange station, as there are external calls of the network subscribers as may occur simultaneously, e.g. six. The transmitting/receiving devices are for the most part identical with those of a subscriber station. Merely the functions which are otherwise actuated by the subscriber, are observed by a master control device 32. Since the signaling information provided by the exchange station is transmitted over a separate data channel to the radio concentrator, a common selection and address computer 33 can be employed instead of the individual selection and address computers 27 illustrated in FIG. 4. The master control device 32 coordinates the individual transmitting/receiving devices also with respect to the RF channel frequencies to be used in such a manner that a mutual disturbance of the individual transmitting/receiving devices in impossible. In addition, it stores all RF frequency addresses which are used in existing connections and separates all frequency addresses for incoming, as well as for outgoing, connection, which utilization might cause a disturbance of already existing connections.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A radio transmission system in which two subscribers use only one of possibly several frequency channels for a mutual connection, comprising means for regularly interrupting the connection between said subscribers for a short time with respect to the transmitting time, means for establishing a return connection in the manner of a time slot channel having a low transmission capacity in comparison to the actual frequency channel, and means for transmitting information of the return connection by way of the time slot channel, each subscriber having a subscriber station including a transmitting path and a receiving path, a buffer memory connected to said transmitting and receiving paths to time compress outgoing information and time expand incoming information, a crypto device to code outgoing information and decode incoming information, first transfer switch means for selectively connecting said crypto device to said buffer memory and selectively to said transmitting and receiving paths, means storing a program of frequency channels, a transmitter and a receiver connecting said frequency channel program storage means to said transmitting and receiving paths, an antenna, second switch means for selectively connecting said antenna to said transmitter and said receiver, and an address computer connected to said frequency program storage means and adapted to receive subscriber address and interrupt information, and further comprising means for providing a succession of time slots organized as a time multiplex system to interlace the preferred channels.

2. A radio transmission system according to claim 1 having a number of frequency channels which is considerably smaller than the number of subscribers of the system, comprising a transmitting/receiving device at an individual subscriber which is adjustable to one of all of the frequency channels, means for assigning some of the total number of frequency channels as preferred frequency channels to the receiver of the individual subscriber, means in the transmitting/receiving device for testing the preferred frequency channels in sequence in their respective time slots to detect the presence of information of other subscribers, and means for identifying the corresponding subscriber in response to the detection of such information.

3. A radio system according to claim 2, comprising means for transmitting a call from a calling subscriber in a free one of the preferred frequency channels of the receiving subscriber, means at the called subscriber for causing a return call in the free frequency channel to the calling subscriber, including means for producing a synchronization of both subscribers with respect to the time slot channel, and means for starting transmission of information after synchronization.

4. A radio transmission system according to claim 1, comprising means for adjusting the transmission power of the transmitting subscriber to the minimum level required for transmission.

5. A radio system according to claim 1, comprising crypto devices at each subscriber, means for transmitting a call in a free one of the preferred frequency channels to a called subscriber, and means responsive to the transmission to effect a return call in the same frequency channel to the calling subscriber and to effect synchronization of the crypto devices.

6. A radio transmission system according to claim 1 comprising means for adjusting the transmission performance of a transmitting subscriber to the minimum level required for transmission.

7. A radio transmission system in which two subscribers use only one of possibly several frequency channels for a mutual connection, comprising means for regularly interrupting the connection between said subscribers for a short time with respect to the transmitting time, means for establishing a return connection in the manner of a time slot channel having a low transmission capacity in comparison to the actual frequency channel, and means for transmitting information of the return connection by way of the time slot channel, each subscriber having a subscriber station including a transmitting path and a receiving path, a buffer memory connected to said transmitting and receiving paths to time compress outgoing information and time expand incoming information, a crypto device to code outgoing information and decode incoming information, first transfer switch means for selectively connecting said crypto device to said buffer memory and selectively to said transmitting and receiving paths, means storing a program of frequency channels, a transmitter and a receiver connecting said frequency channel program storage means to said transmitting and receiving paths, an antenna, second switch means for selectively connecting said antenna to said transmitter and said receiver, and an address computer connected to said frequency program storage means and adapted to receive subscriber address and interrupt information, means for alternately monitoring the respective subscriber frequency channel and the frequency channels of the frequency channel program stored in the time slot, means for detecting a call from a third subscriber when busy with another subscriber and operable to transmit a receipt signal in the following time slot, said receipt signal being received by said third subscriber in the receipt slot of the call transmission, and means at said third subscriber to interrupt its call transmission and receive a busy signal transmitted by a busy subscriber in one of the subsequent time slots.

8. A radio transmission system in which two subscribers use only one of possibly several frequency channels for a mutual connection, comprising means for regularly interrupting the connection between said subscribers for a short time with respect to the transmitting time, means for establishing a return connection in the manner of a time slot channel having a low transmission capacity in comparison to the actual frequency channel, and means for transmitting information of the return connection by way of the time slot channel, each subscriber having a subscriber station including a transmitting path and a receiving path, a buffer memory connected to said transmitting and receiving paths to time compress outgoing information and time expand incoming information, a crypto device to code outgoing information and decode incoming information, first transfer switch means for selectively connecting said crypto device to said buffer memory and selectively to said transmitting and receiving paths, means storing a program of frequency channels, a transmitter and a receiver connecting said frequency channel program storage means to said transmitting and receiving paths, an antenna, second switch means for selectively connecting said antenna to said transmitter and said receiver, and an address computer connected to said frequency program storage means and adapted to receive subscriber address and interrupt information, means for alternately monitoring the respective subscriber frequency channel and the frequency channels of the frequency channel program stored in the time slot, means for detecting a call from a third subscriber when busy with another subscriber and operable to transmit a receipt signal in the following time slot, said receipt signal being received by said third subscriber in the receipt slot of the call transmission, means at said third subscriber to cause a third subscriber hold condition and provide an indication signal to the called busy subscriber as a modification of the call signal, and means at each subscriber for examining the hold condition of a third subscriber in each subsequent time slot and responsive to a free channel condition of the busy subscriber to immediately through connect to the third subscriber.

* * * * *